United States Patent [19]

Takane

[11] Patent Number: 4,672,538
[45] Date of Patent: Jun. 9, 1987

[54] METHOD OF DYNAMICALLY CHANGING FORMATION OF ADDRESSES IN MEMORY OF A DATA PROCESSING SYSTEM

[75] Inventor: Hisao Takane, Tokyo, Japan
[73] Assignee: NEC Corporation, Tokyo, Japan
[21] Appl. No.: 666,056
[22] Filed: Oct. 29, 1984
[30] Foreign Application Priority Data

Oct. 31, 1983 [JP] Japan .................................. 58-203994

[51] Int. Cl.$^4$ ............................................. G06F 13/00
[52] U.S. Cl. ..................................... 364/200; 364/900
[58] Field of Search .................................. 364/200, 900

[56] References Cited

U.S. PATENT DOCUMENTS

| | | | |
|---|---|---|---|
| 4,050,060 | 9/1977 | Birney et al. | 364/200 |
| 4,281,392 | 7/1981 | Grants et al. | 364/900 |
| 4,408,274 | 10/1983 | Wheatley et al. | 364/200 |
| 4,453,212 | 6/1984 | Gaither et al. | 364/200 |
| 4,466,056 | 8/1984 | Tanahashi | 364/200 |

FOREIGN PATENT DOCUMENTS

57-3284  1/1982  Japan .

Primary Examiner—Gareth D. Shaw
Assistant Examiner—Randy W. Lacasse
Attorney, Agent, or Firm—Schwartz, Jeffery, Schwaab, Mack, Blumenthal & Evans

[57] ABSTRACT

There is provided a method of dynamically changing the formation of addresses in a memory of a data processing system having a segment descriptor register adapted to hold segment descriptor words for prescribing segments containing instruction words and data stored in the memory and having memory addresses, an address register for designating addresses of the data, and an instruction counter for designating addresses of the instruction words. The method comprises a first step for storing the segment descriptor words in the segment descriptor register, a second step for controlling by the segment descriptor register the number of effective bits of the address register and instruction register, a third step for forming an address of an instruction word by adding the content of the segment descriptor register and the content of the effective bits of the instruction counter, and a fourth step for forming an address of a data by adding the content of the segment descriptor register, the content of the effective bits of the address register and the address in the instruction word.

2 Claims, 11 Drawing Figures

METHOD OF DYNAMICALLY CHANGING FORMATION OF ADDRESSES IN MEMORY OF A DATA PROCESSING SYSTEM

BACKGROUND OF THE INVENTION

The present invention relates to a method of dynamically changing the formation of addresses in the memory of a data processing system.

Owing to the recent, remarkable development of hardware technology, it is possible now to use memories of greater capacity in data processing systems, and demand for such memories is growing acceleratedly stronger in the market, too. When increasing the capacity of the memory of a data processing system, however, the capability to address the memory needs to be augmented also, which necessitates an alternation of visibility to the software. As a result, it becomes impossible to use programs, adapted for conventional data processing systems, in expanded data processing systems having capabilities to address memories of large capacities, and the consequence is grave.

For the purpose of obviating this problem in a data processing system capable of changing the address formation, a method has been heretofore proposed which gives the hardware a new function in addition to the usual one for execution of existing programs and determines which funciton to use at the time of raising the system. U.S. patent application No. 265,122/1981 (Japanese Preliminary Patent Publication No. 57-3284) discloses an address control system wherein the address field of an instruction is divided into a first field and a second field having a displacement address indicative of a displacement from the base address, and the addressing capability is expanded by adding to the displacement address the relocation addresses of the index and segment designated by the first field. According to this method, once the system is raised, only the program corresponding to the prescribed function can be used. But, on account of the structure of programs, it is common that a newly developed program uses the existing original program as a subroutine. It is, therefore, a serious disadvantage that a program developed corresponding to a new function can not use as a subroutine the program which can be executed solely in the existing original function.

SUMMARY OF THE INVENTION

An object of this invention is to eliminate the above-mentioned disadvantage and provide a method of dynamically changing the formation of addresses capable of simultaneously executing programs corresponding to different addressing schemes in the memory of a data processing system.

Another object of this invention is to provide a method of dynamically changing the formation of addresses capable of expanding capability to address the memory without extensively affecting the software in the memory of a data processing system.

According to this invention, there is provided a method of dynamically changing the formation of addresses in a memory of a data processing system having a segment descriptor register adapted to hold segment descriptor words for prescribing segments containing instruction words and data stored in the memory and having memory addresses, an address register for designating addresses of the data, and an instruction counter for designating addresses of the instruction words. The method comprises a first step for storing the segment descriptor words in the segment descriptor register, a second step for controlling by the segment descriptor register the number of effective bits of the address register and instruction register, a third step for forming an address of an instruction word by adding the content of the segment descriptor register and the content of the effective bits of the instruction counter, and a fourth step for forming an address of a data by adding the content of the segment descriptor register, the content of the effective bits of the address register and the address in the instruction word.

DESCRIPTION OF PREFERRED EMBODIMENT

A preferred embodiment of this invention will now be explained in detail with reference to the accompanying drawings.

Figure 1:
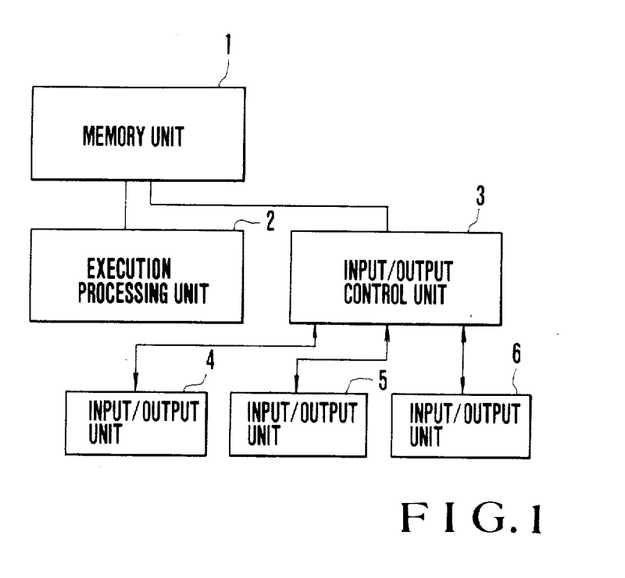
FIG. 1 shows an example of a data processing system to which this invention can be applied.

Referring to FIG. 1 a data processing system to which an embodiment of this invention is applied comprises a memory unit 1, an execution processing unit 2, an input/output control unit 3 and input/output units 4, 5 and 6.

The memory units 1 stores instruction words and data required for executing a program.

The execution processing unit 2 reads the instruction words and data out of the memory units 1 and executes the program. The input/output control units 3 controls data transfer between the memory unit 1 and each of the input/output units 4, 5 and 6.

Figure 2:
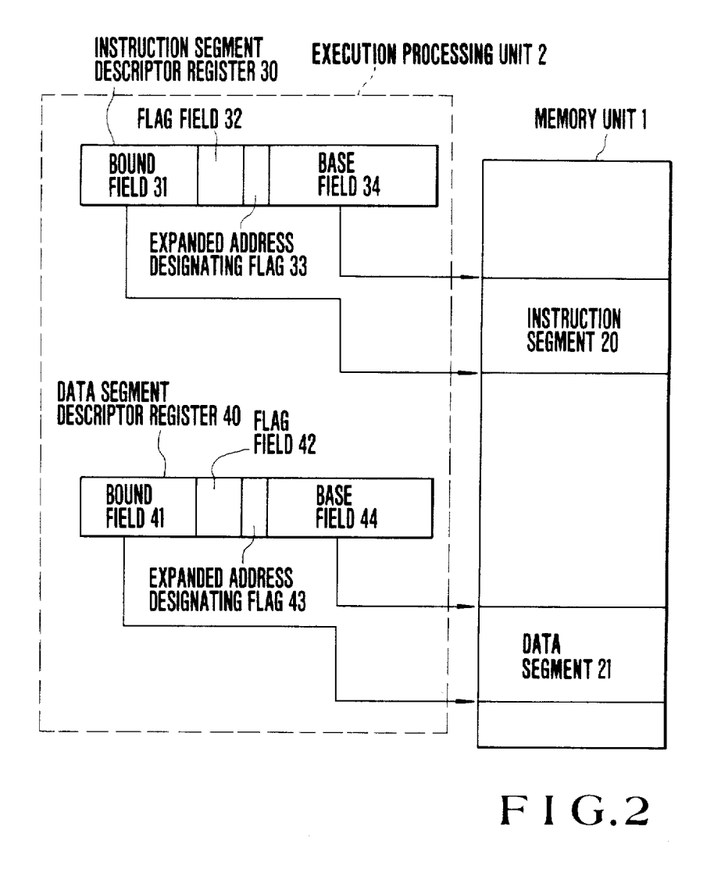
FIG. 2 shows the relationship between segments and a segment descriptor register.

FIG. 2 shows the relationship between segments in the memory unit 1 and the segment descriptor register having an instruction segment descriptor register 30 and a data segment descriptor register 40 and included in the execution processing unit 2. An instruction segment 20 containing instruction words is prescribed by segment descriptor word and the segment descriptor word is held in the instruction segment descriptor register 30 which consists of a bound field 31, a flag field 32, an expanded address designating flag 33 and a base field 34. The content of the base field 34 having 36 bits designates the base address of the instruction segment 20 by unit word, for example. The content of the bound field 31 designates the magnitude of the instruction segment 20 by unit word, for example. The content of the flag field 32 gives the instruction segment 20 such segment properties as permission for execution and permission for write. The content of the expanded address designating flag 33 designates schemes of forming addresses for the memory unit 1. The content of a data segment 21 containing data is prescribed by segment descriptor word which is held in the data segment descriptor register 40. The data segment descriptor register 40 consists of a bound field 41, a flag field 42, an expanded address designating flag 43 and a base field 44. The content of the base field 44 having 36 bits designates the base address of the data segment 21 by unit word, for example. The content of the bound field 41 designates the magnitude of the data segment 21 by unit word, for example. The content of the flag field 42 gives the data segment 21 such segment properties as permission for read and permission for write. The expanded address designating flag 43 in the data segment descriptor register 40 has no meaning and is ignored. In accordance with an instruction, the instruction segment descriptor register 30 and data segment descriptor register 40 are loaded with a segment descriptor word in the memory unit 1.

Figure 3:
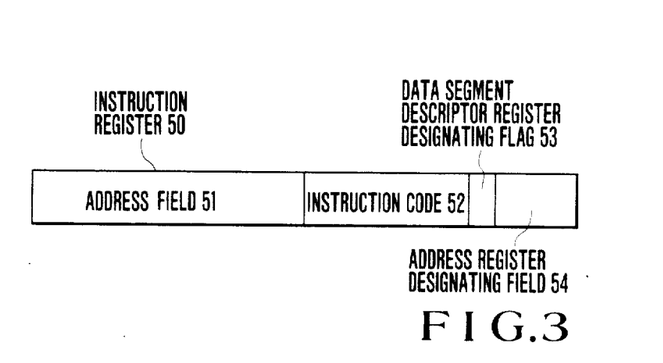
FIG. 3 shows an example of an instruction word format used in this invention.

FIG. 3 shows an example of an instruction register used in this invention for holding instruction words. An instruction register 50 consists of an address field 51, an instruction code 52, a data segment descriptor register designating flag 53 and an address register designating field 54. The address field 51 having 18 bits designates addresses for the data in the memory unit 1 by unit word, for example. The instruction code 52 designates the processing of instructions. The data segment descriptor register designating flag 53 designates whether the instruction segment descriptor register 30 should be used or the data segment descriptor register 40 should be used when reading data out of the memory unit 1. The address register designating field 54 designates an address register 61 from among a plurality of address registers used for forming addresses for data in the memory unit 1.

Figure 4:
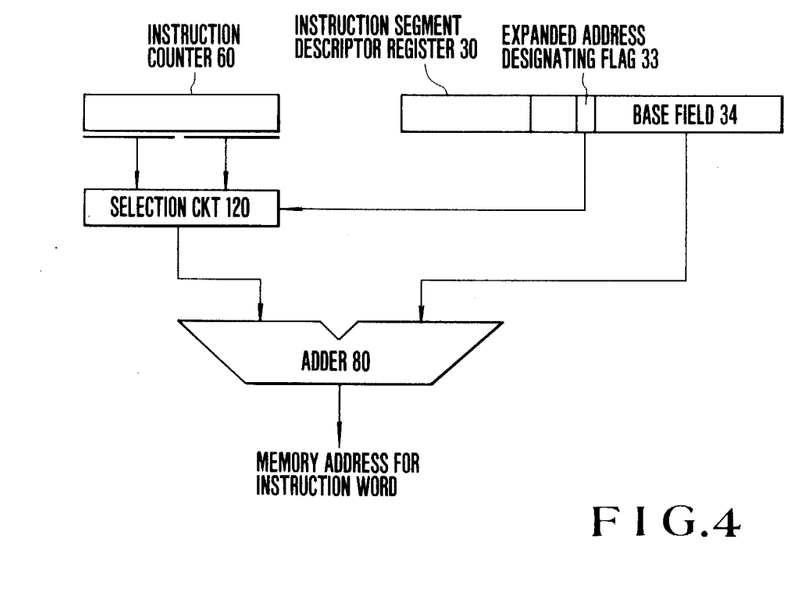
FIGS. 4 and 5 show block diagrams of exemplary circuits used in this invention.

FIG. 4 shows a circuit used for forming addresses for instruction words. The content of an instruction counter 60 designating addresses for the instruction words to be executed and the content of the base field 34 in the instruction segment descriptor register 30 are added by an adder 80 to form addresses for instruction words, in the course of which the number of the effective bits of the instruction counter 60 is designated by a selection circuit 120 controlled by the expanded address designating flag 33 in the instruction segment descriptor register 30.

Figure 5:
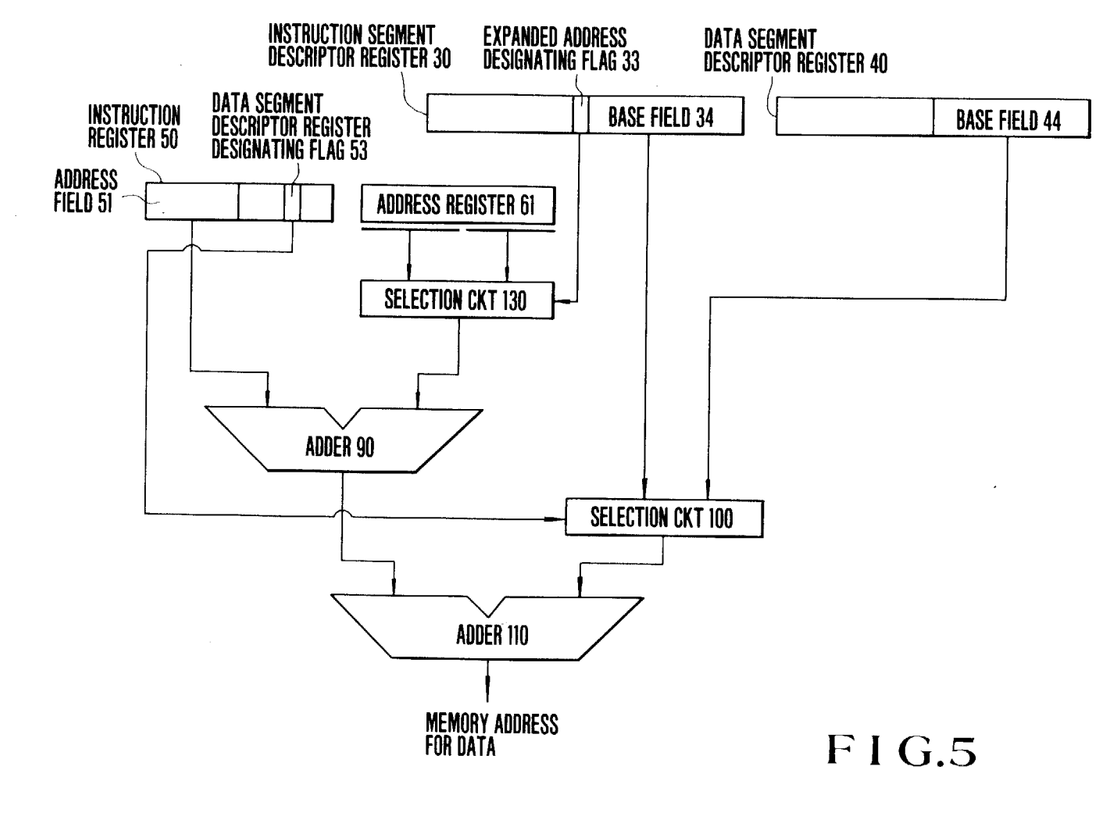

FIG. 5 shows a circuit used for forming addresses for data. First, the content of the address field 51 in the instruction register 50 and the content of the address register 61 are added by an adder 90. Then, the result of this addition and the content of the base field 34 in the instruction segment descriptor register 30 or of the base field 44 in the data segment descriptor register 40 are added by an adder 110 to form addresses for data. Whether to choose the base field 34 or 44 is determined by a selection circuit 100 controlled by the data segment descriptor register designating flag 53 in the instruction register 50. The number of the effective bits of the address register 61 is designated by a selection circuit 130 controlled by the expanded address designating flag 33 in the instruction segment descriptor register 30.

A method of forming addresses in the memory unit 1 with the use of the construction shown in FIGS. 1, 2, 3, 4 and 5 will now be explained with reference to FIGS. 6, 7, 8, 9, 10 and 11.

Figure 6:
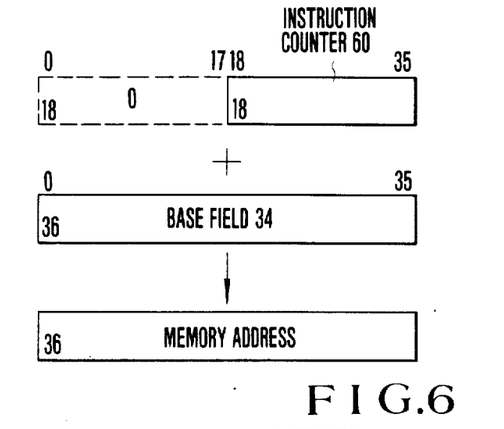
FIGS. 6, 7, 8, 9, 10 and 11 are diagrams useful in explaining an embodiment of this invention.

FIG. 6 indicates a method of forming addresses for instruction words in the case the expanded address designating flag 33 in the instruction segment descriptor register 30 is "0". The state of the expanded address designating flag 33 in the instruction segment descriptor register 30 being "0" will hereinunder be called a non-expanded address mode and the state of the expanded address designating flag 33 being "1" will be called an expanded address mode. In the case of the non-expanded address mode, only the lower 18 bits (bits 18 to 35) of the 36 bits of the instruction counter 60 designating addresses for the instruction words to be executed become effective, and the content of the lower 18 bits of the instruction counter 60 and the content of the base field 34 having 36 bits in the instruction segment descriptor register 30 are added to form addresses for instruction words.

Figure 7:
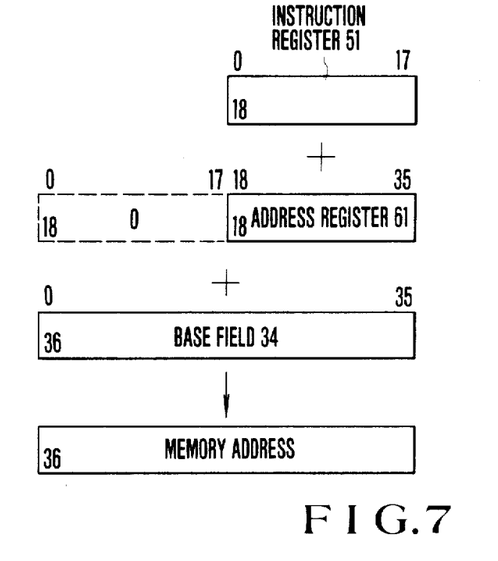

FIG. 7 indicates a method of forming addresses for data in the non-expanded address mode under an instruction segment mode. A method of forming addresses for data depends on the state of the data segment descriptor register designating flag 53 in the instruction register 50 (the state of the data segment descriptor register flag 53 in the instruction register 50 being "0" will hereinunder be called the instruction segment mode and the state of the data segment descriptor flag 53 being "1" will be called a data segment mode). Data are read out of the instruction segment 20. In the non-expanded address mode, only the lower 18 bits (bits 18 to 35) of the 36 bits of the address register 61 designated by the address register designating field 54 in the instruction register 50 become effective. Consequently, in the non-expanded address mode under instructin segment mode, the content of the address field 51 in the instruction register 50, the content of the lower 18 bits of the address register 61 and the content of the base field 34 having 36 bits in the instruction segment descriptor register 30 are added to form the addresses for data.

Figure 8:
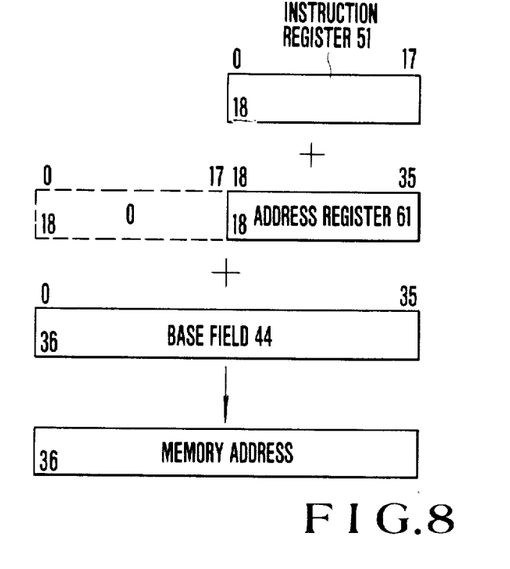

FIG. 8 indicates a method of forming addresses for data in the non-expanded address mode under data segment mode. The data for executing instructions are read out of the data segment. The content of the address field 51 having 18 bits in the instruction register 50, the content of the lower 18 bits of the address register 61 and the content of the base field 44 having 36 bits in the data segment descriptor register 40 are added to form the addresses for data.

Figure 9:
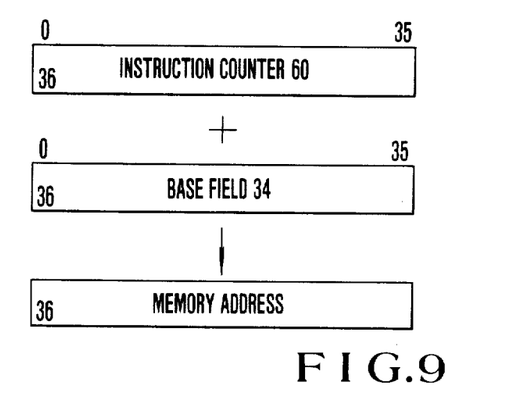

FIG. 9 indicates a method of forming addresses for instruction words in the expanded address mode. In the expanded address mode, all 36 bits of the instruction counter 60 designating addresses for the instruction words to be executed become effective, and addresses for instruction words are formed by adding the content of the 36 bits of the instruction counter 60 and the content of the 36-bit base field 34 in the instruction segment descriptor register 30.

Figure 10:
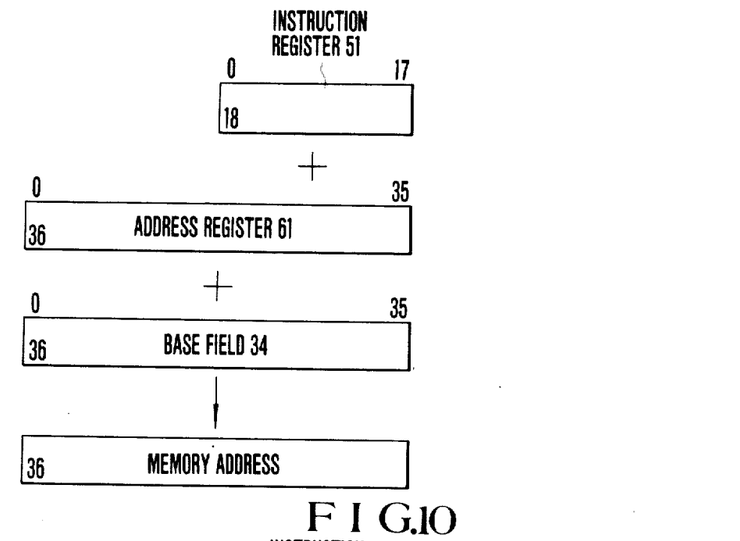

FIG. 10 indicates a method of forming addresses for data in the expanded address mode under instruction segment mode. In the expanded address mode, all 36 bits of the address register 61 designated by the address register designating field 54 in the instruction register 50 become effective. As a result, in the expanded address mode under instruction segment mode, the content of the 18-bit address field 51 in the instruction register 50, the content of the 36 bits of the address register 61 and the content of the 36-bit base field 34 in the instruction segment descriptor register 30 are added to form addresses for data.

Figure 11:
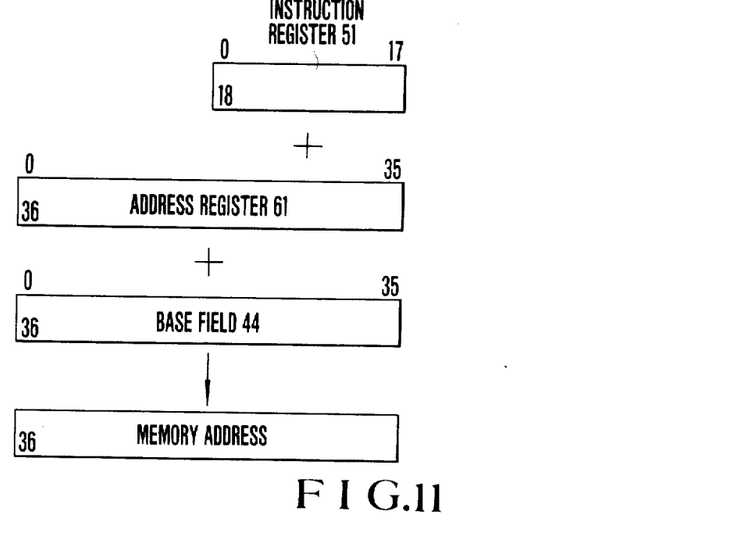

FIG. 11 indicates a method of forming addresses for data in the expanded address mode under data segment mode. In this case, the content of the 18-bit address field 51 in the instruction register 50, the content of the 36 bits of the address register 61 and the content of the 36-bit base field 44 in the data segment descriptor register 46 are added to form addresses for data.

As can be told from the foregoing explanation, according to the preferred embodiment of the present invention, instruction addresses and data addresses respectively of up to 256 kilo words ($2^{18}$ bits) or 64 giga words ($2^{36}$ bits) can be formed by controlling the registers in the data processing system.

To add, although no mention is made with respect to the above preferred embodiment, obviously, it is feasible to regard the formed addresses as imaginary addresses and convert them into real addresses through the so-called paging process. Further, the embodiment described above is only an example and it is also clear that the application of this invention is not limited to the specific case taken up above as a preferred embodiment.

Thus the present invention attains an effect that the formation of addresses in a memory can be changed dynamically by changing the addressing schemes under the control of registers settable by the software instructions.

What is claimed is:

1. A method of dynamically changing the formation of addresses in a memory of a data processing system having a segment descriptor register adapted to hold segment descriptor words for prescribing segments containing instruction words and data stored in the memory and having memory addresses, an address register for designating addresses for data stored in the memory, and an instruction counter for designating addresses of the instruction words stored in the memory, said method comprising a first step for storing said segment descriptor words in said segment descriptor register, a second step for controlling the number of effective bits of said address register and instruction counter in accordance with information in said segment descriptor register, a third step for designating an address of an instruction word in the memory to be executed by adding the content of the segment descriptor register and the content of the effective bits of said instruction counter, and a fourth step for designating an address of a data in the memory by adding the content of said segment descriptor register, the content of the effective bits of said address register and said address of said instruction word.

2. A method of dynamically changing the formation of addresses for instruction words and data in a memory of a data processing system having an instruction segment descriptor register adapted to hold segment descriptor words for prescribing segments containing instruction words or data stored in the memory and having memory addresses, a data segment descriptor register adapted to hold segment descriptor words for prescribing segments containing data, an address register for designating addresses for data in the memory, and an instruction counter for designating addresses for instruction words in the memory, said method comprising a first step for storing in said instruction segment descriptor register said segment descriptor words for prescribing the segments containing instruction words, a second step for storing in said data segment descriptor register said segment descriptor words for prescribing the segments containing data, a third step for controlling the number of effective bits of said address register and instruction counter in accordance with information in said instruction segment descriptor register, a fourth step for designating an address of an instruction word in the memory to be executed by adding the content of said instruction segment descriptor register and the content of the effective bits of said instruction counter, and a fifth step for designating an address of a data in the memory by adding the content of said data segment descriptor register, the content of the effective bits of said address register and said address of said instruction word.

* * * * *